US006568693B2

(12) United States Patent
Glass

(10) Patent No.: US 6,568,693 B2
(45) Date of Patent: May 27, 2003

(54) RATCHETING HAND HELD TOOL

(75) Inventor: Brian Glass, Baltimore, MD (US)

(73) Assignee: Black & Decker Inc., Newark, DE (US)

(*) Notice: Subject to any disclaimer, the term of this patent is extended or adjusted under 35 U.S.C. 154(b) by 27 days.

(21) Appl. No.: 09/861,066

(22) Filed: May 18, 2001

(65) Prior Publication Data

US 2002/0002881 A1 Jan. 10, 2002

Related U.S. Application Data

(60) Provisional application No. 60/206,882, filed on May 24, 2000.

(51) Int. Cl.[7] .............................. B23B 5/22; B23B 5/34; B23B 13/46

(52) U.S. Cl. ............................ 279/80; 81/63.1; 81/58.3; 192/43.2

(58) Field of Search ............................ 408/123; 279/80; 81/60, 63.1, 58.3; 192/43.2

(56) References Cited

U.S. PATENT DOCUMENTS 1,653,762 A * 12/1927 Fegley
3,844,322 A * 10/1974 Stoutenberg
4,427,100 A 1/1984 Rude et al.
4,621,718 A 11/1986 DeCarolis
4,777,852 A 10/1988 Herman et al.
5,069,091 A 12/1991 Bramsiepe et al.
5,535,648 A 7/1996 Braun et al.
5,573,093 A * 11/1996 Lee
5,582,081 A 12/1996 Lin
5,609,078 A * 3/1997 Yang
5,632,186 A 5/1997 Lin
5,651,294 A 7/1997 Shiao
5,685,204 A * 11/1997 Braun
5,974,915 A 11/1999 Chou
6,047,617 A * 4/2000 Chen
6,053,675 A * 4/2000 Holland
6,058,812 A 5/2000 Casel et al.
6,206,160 B1 * 3/2001 Chen

FOREIGN PATENT DOCUMENTS

DE 29821207 U1 4/1999
EP 0661139 B1 3/1999

* cited by examiner

*Primary Examiner*—Sebastiano Passaniti
(74) *Attorney, Agent, or Firm*—Harness, Dickey & Pierce, P.L.C.

(57) ABSTRACT

A hand held tool is provided with a handle, a ratcheting mechanism connected to the handle, and a quick release bit coupling device connected to the ratcheting mechanism.

3 Claims, 3 Drawing Sheets

RATCHETING HAND HELD TOOL

CROSS REFERENCE TO RELATED APPLICATIONS

This application claims the benefit of U.S. provisional application Ser. No. 60/206,882 filed May 24, 2000.

FIELD OF THE INVENTION

The present invention relates generally to a hand held bit driver and, more particularly, to a ratcheting hand held driver.

DISCUSSION

Hand held drivers including a variety of changeable bits including nut drivers and screwdrivers and the like have been generally known in the art for some time. In addition, hand held drivers having a ratcheting mechanism have also been known in the art. However, it is desirable in the art to provide a hand held driver having a ratcheting mechanism and a bit coupling device that allows for the quick and efficient changing of bits for driving engagement with the handle.

With the above objects in mind, the present invention is generally directed to a hand held tool having a handle, a ratcheting mechanism having an input member attached for rotation with said handle and an output member engageable with said input member in a first operating mode for rotation in a clockwise and a counterclockwise direction, in a second operating mode for ratcheting rotation in a clockwise direction and in a third operating mode for ratcheting rotation in a counterclockwise direction; and a quick release bit coupling device having a first end connected to said output member of said ratcheting mechanism and having a second end adapted for releasably engaging a drive bit.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
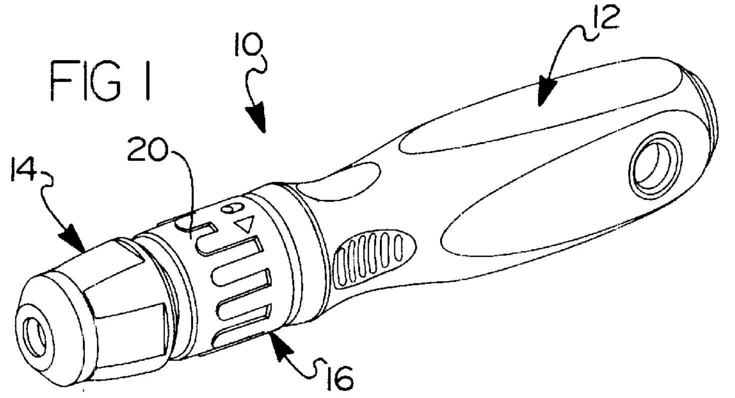
FIG. 1 is a perspective view of a ratcheting hand held tool according to the principles of the present invention.
Figure 2:
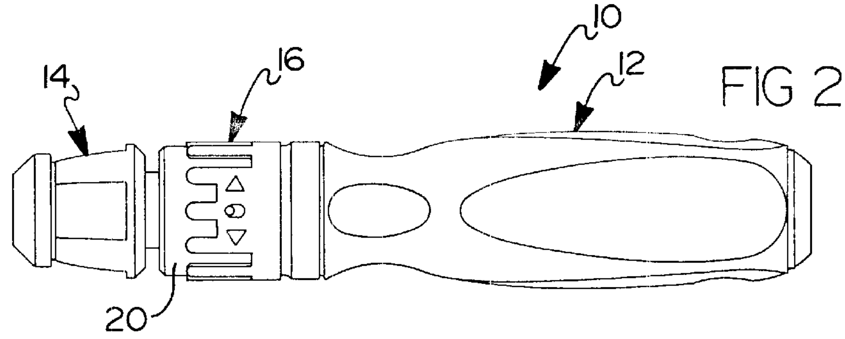
FIG. 2 is a side view of the ratcheting hand held tool shown in FIG. 1.

As shown in the drawings, the ratcheting hand held tool 10 includes a handle 12, a quick release bit coupling device 14, and a ratchet assembly 16. The ratchet assembly 16 is constructed to provide selective operation in a neutral mode where an operator may rotate a bit in both a clockwise and a counterclockwise direction, a first actuating mode for ratcheting rotation in a clockwise direction, and a second actuating mode for ratcheting rotation in a counterclockwise direction. The device includes an indexer configuration that provides an audible and/or tactile indication that the ratchet mode has been changed and a bearing sleeve that increases the tool's resistance to bending loads and provides smoother operation.

Figure 3:
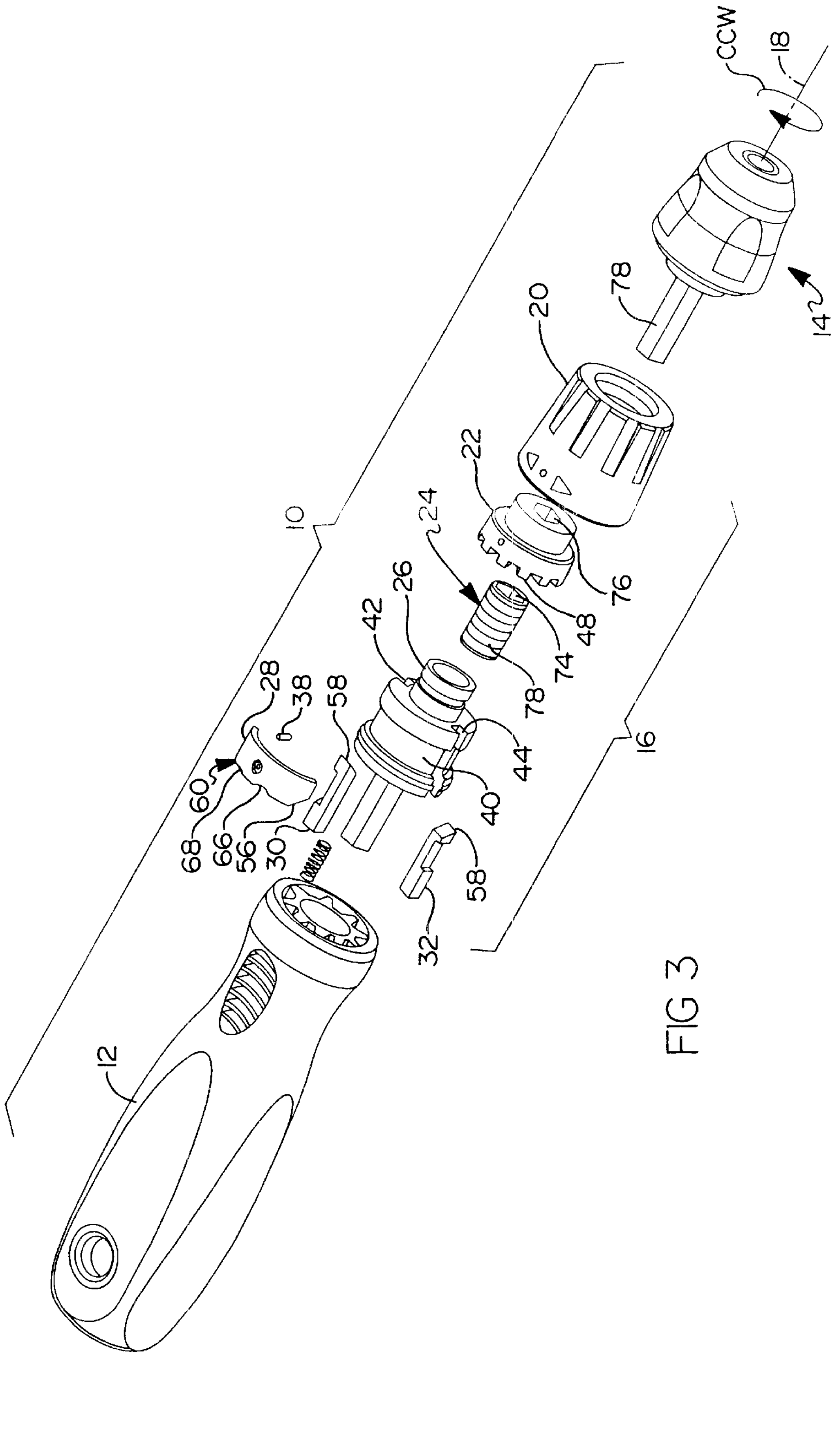
FIG. 3 is an exploded perspective view of a ratcheting hand held tool according to the principles of the present invention.
Figure 6:
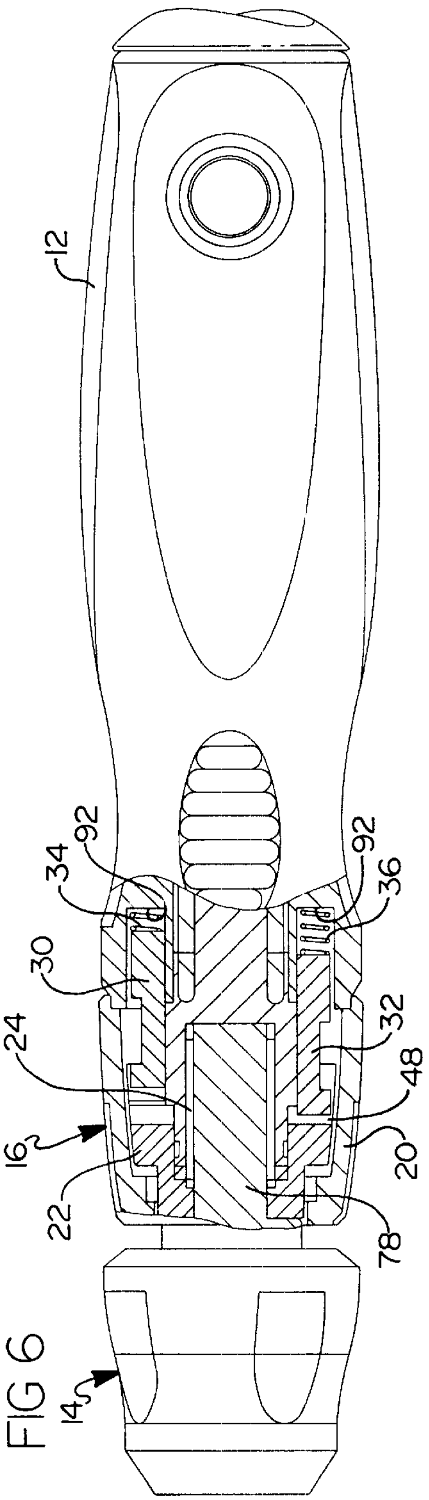
FIG. 6 is a partial sectional view of the ratcheting mechanism implemented in the hand held tool of the present invention.

With reference to FIG. 3, ratchet assembly 16 includes a collar 20, a ratchet gear 22, a bearing 24, a clutch chassis 26, an indexer 28, first and second actuators 30 and 32, and first and second springs 34 and 36 (best shown in FIG. 6). The collar 20 is fixed to the indexer 28 by a pin 38. The indexer 28 is disposed within a cylindrical recess 40 defined in chassis 26 thereby coupling the collar 20 and indexer 28 for rotation relative to the chassis 26. The collar retains the gear 22 and bearing 24 against axial displacement away from handle 12. As the collar 20 is rotated between its neutral, first operative, and second operative positions, the indexer 28 displaces the first and second actuators 30 and 32 within corresponding axial slots 42 and 44 of chassis 26 and between engaged and disengaged positions.

Figure 4:
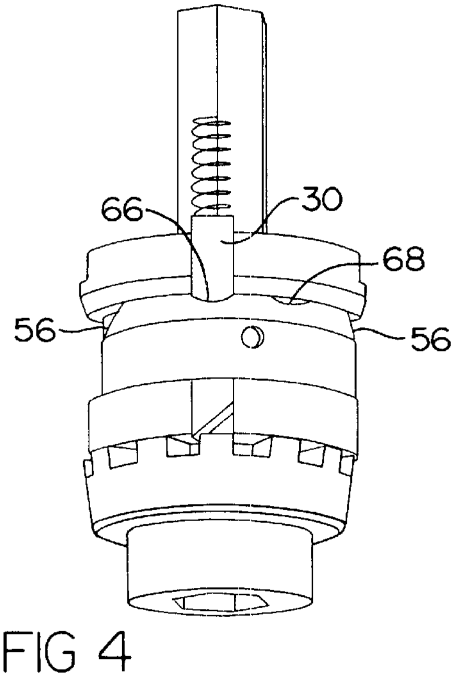
FIG. 4 is a perspective view of the ratcheting mechanism with the collar removed to illustrate the indexer disengaging an actuator from the ratchet gear member.
Figure 5:
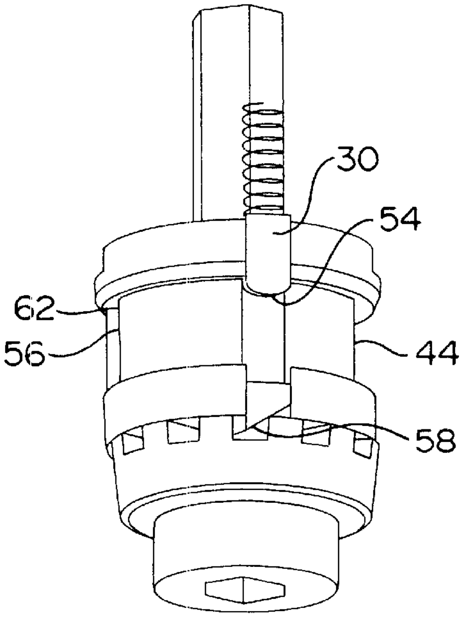
FIG. 5 is a perspective view of the ratcheting mechanism with the collar removed to illustrate an actuator engaged with the ratchet gear member.

When the collar 20 is located in its neutral position, the indexer 28 does not engage either of the first or second actuators 30 and 32. As a result, the springs 34 and 36 force the actuators into their engaged position with the teeth 48 projecting rearwardly from ratchet gear 22. In the illustrated embodiment, the engagement of the first actuator 30 with the gear teeth 48 fixes the ratchet gear 22 for rotation with the handle in a clockwise direction about axis 18 whereas engagement of the second actuator 32 with the gear teeth 48 fixes the ratchet gear 22 for rotation with the handle in a counterclockwise direction. Upon movement of the collar from its neutral position to either the first or second operative positions, an engagement surface 54 (FIG. 5) on the appropriate first or second actuator 30 or 32 engages and rides along one of the angled surfaces 56 (FIGS. 3 and 4) on the indexer such that the locking tip 58 is removed from engagement with gear teeth 48. The actuator 30, 32 is maintained in its disengaged position so long as the engagement surface 54 contacts the rearward indexer surface 60 (FIGS. 3 and 4). The clutch chassis 26 includes a stop 62 (FIG. 5) projecting from the recess 44 to limit movement of the indexer in both clockwise and counterclockwise directions.

The audible/tactile indication of the ratchet mode is provided by the configuration of the rearward indexer surface 60. More particularly, the rearwardly facing surface 60 of the indexer 28 includes first and second seats 66 and 68 (FIGS. 3 and 4) that are configured to accommodate the engagement surfaces 54 of the first and second actuators 30,32 when the collar 20 is placed into its first and second operating positions, respectively. The seating of the actuators 30,32 is felt by the operator and generates an audible click or similar noise to inform the operator that the collar 20 has been rotated to its first or second position.

Figure 7:
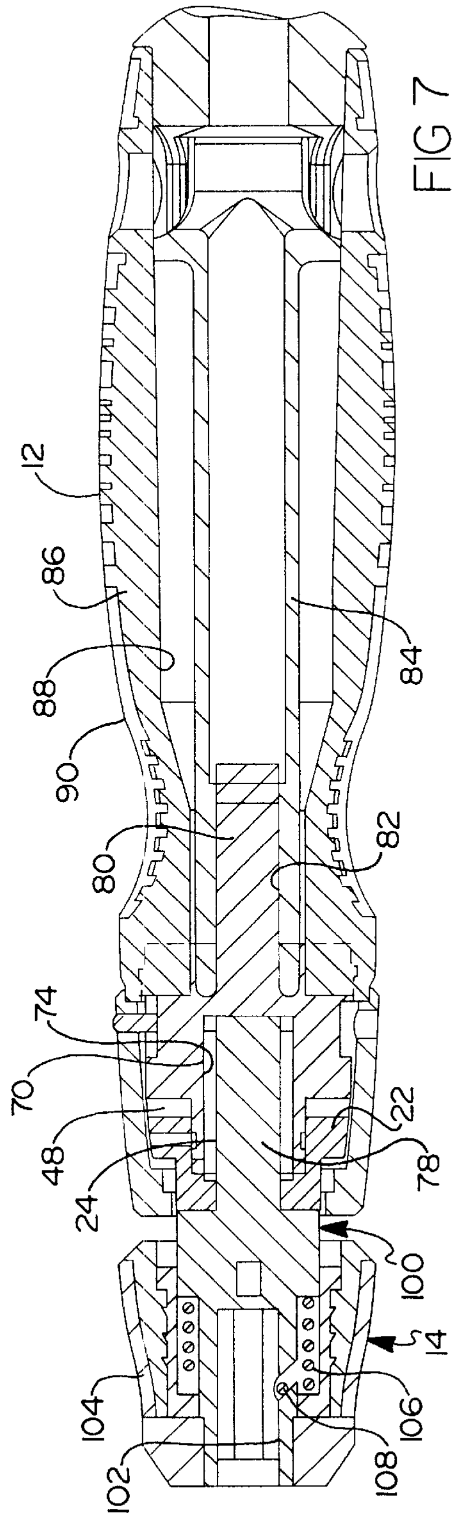
FIG. 7 is a cross-sectional view of the hand held tool of the present invention.

As to the increased robustness and operating smoothness of the ratchet assembly 16, the bearing 24 includes a generally cylindrical outer surface 70 and an inner hex-shaped aperture 74 (FIG. 3). The bearing 24 is disposable within a correspondingly configured aperture 72 in the clutch chassis 26 and the inner hex-shaped aperture 74 is configured to cooperate with a hex-shaped opening 76 in the ratchet gear 22 to form a passage that accommodates the hex-shaped shank 78 of the quick release bit coupling device 14. The bearing 24, preferably formed of brass, securely retains the shank 78 such as by press fitting, adhesives or other known fastening techniques when torque is applied on the tip of the tool. The bearing 24 further includes external circumferential grooves 78 that retain lubricant to provide smoother movement of the bearing 24 and quick release bit coupling device 14 relative to the clutch chassis 26. As best seen in FIG. 7, the clutch chassis 26 includes a hex-shaped shank 80 which is received in a hex-shaped opening 82 disposed in the end of the handle 12. Hex-shaped shank 80 can be press fit within hex-shaped opening 82 or otherwise secured therein by an adhesive or other known fastening technique. The handle 12 includes an inner sleeve 84 which generally extends the length of the handle 12. Hex-shaped opening 82 is defined within the inner sleeve 84. Handle 12 also includes a body portion 86 which defines a bore 88 therethrough for receiving the inner sleeve 84. The body portion 86 is preferably coated with a soft elastomeric coating 90. The body portion 86 of handle 12 includes a pair of bores 92 in an end portion thereof, best seen in FIG. 6. Springs 34,36 are received within bores 92 and press against actuators 30,32, respectively.

The quick release bit coupling device 14 includes a main body portion 100 including hex-shaped shank 78 at one end and a hex-shaped bore 102 at a second end. A release collar 104 is biased by a spring 106 to an engagement position which maintains a retaining clip 108 in an engaged position. Release collar 104 is slidable against the biasing force of spring 106 to a release position wherein retaining clip 108 is allowed to disengage from a recess position disposed in a hex-shaped shank of a changeable bit (not shown). A bit holder of the type illustrated herein is more completely described in commonly assigned U.S. Pat. No. 6,053,675 issued Apr. 25, 2000, which is herein incorporated by reference.

The invention being thus described, it will be obvious that the same may be varied in many ways. For example, the ratcheting mechanism 16 has been shown for illustrative purposes and it should be understood that other ratcheting mechanisms known in the art could be used without departing from the spirit and scope of the present invention. For example, U.S. Pat. No. 3,844,322, herein incorporated by reference, discloses a ratcheting mechanism which could be adapted for use with the present invention. Such variations are not to be regarded as a departure from the spirit and scope of the invention, and all such modifications as would be obvious to one skilled in the art are intended to be included within the scope of the following claims.

What is claimed is:

1. A hand held tool, comprising:

a handle;

a ratcheting mechanism having an input member attached for rotation with said handle and an output member engageable with said input member in a first operating mode for rotation in a clockwise and a counterclockwise direction, in a second operating mode for ratchet rotation in a clockwise direction and in a third operating mode for ratcheting rotation in a counterclockwise direction;

a quick release bit coupling device having a first end connected to said output member of said ratcheting mechanism and having a second end adapted for releasably engaging a drive bit, said quick release bit coupling device includes a body portion defining a bore adapted for receiving a drive bit and a release collar disposed about said body portion and biased by a spring to an engaged position for securing a retaining device in an engaged position, said release collar being movable to a release position for releasing said retaining device from said engaged position; and wherein said output member of said ratcheting mechanism is a ratchet gear and said input member of said ratcheting mechanism is a clutch chassis which slidably supports a pair of actuator members which are biased toward said ratchet gear by a pair of springs which are each received in a respective recess defined in an end portion of said handle.

2. The hand held tool according to claim 1, wherein said pair of actuator members are selectively engageable by an indexer member which is rotatable with a collar for selectively switching said ratcheting mechanism between said first, second, and third operating modes.

3. The hand held tool according to claim 2, wherein said indexer member includes a rearwardly facing surface including first and second seats configured for accommodating an engagement surface of said pair of actuator members when said collar is moved to said second and third operating modes, respectively.

* * * * *